US010650524B2

(12) United States Patent
Aksoy et al.

(10) Patent No.: US 10,650,524 B2
(45) Date of Patent: May 12, 2020

(54) DESIGNING EFFECTIVE INTER-PIXEL INFORMATION FLOW FOR NATURAL IMAGE MATTING

(71) Applicant: Disney Enterprises, Inc., Burbank, CA (US)

(72) Inventors: Yagiz Aksoy, Zürich (CH); Tunc Ozan Aydin, Zürich (CH)

(73) Assignees: DISNEY ENTERPRISES, INC., Burbank, CA (US); ETH ZÜRUCH (EIDGENÖSSISCHE TECHNISCHE HOCHSCHULE ZÜRICH), Zürich (CH)

( * ) Notice: Subject to any disclaimer, the term of this patent is extended or adjusted under 35 U.S.C. 154(b) by 138 days.

(21) Appl. No.: 15/887,871

(22) Filed: Feb. 2, 2018

(65) Prior Publication Data
US 2018/0225827 A1 Aug. 9, 2018

Related U.S. Application Data

(60) Provisional application No. 62/454,538, filed on Feb. 3, 2017.

(51) Int. Cl.
*G06K 9/34* (2006.01)
*G06T 7/11* (2017.01)
(Continued)

(52) U.S. Cl.
CPC ............ *G06T 7/11* (2017.01); *G06T 7/162* (2017.01); *G06T 7/187* (2017.01); *G06T 7/90* (2017.01);
(Continued)

(58) Field of Classification Search
CPC ... G06T 7/11; G06T 7/90; G06T 7/162; G06T 7/187; G06T 2207/20072; G06T 2207/10024
See application file for complete search history.

(56) References Cited

U.S. PATENT DOCUMENTS

2007/0165966 A1* 7/2007 Weiss ................. H04N 5/272
382/284
2009/0228510 A1* 9/2009 Slaney ................. G06F 16/68
(Continued)

OTHER PUBLICATIONS

Aksoy et al., "Interactive high-quality green-screen keying via color unmixing", ACM Trans. Graph., 35(5), 2016, 152:1-152:12.
(Continued)

*Primary Examiner* — Amara Abdi
(74) *Attorney, Agent, or Firm* — Kilpatrick Townsend & Stockton LLP

(57) ABSTRACT

Embodiments can provide a strategy for controlling information flow both from known opacity regions to unknown regions, as well as within the unknown region itself. This strategy is formulated through the use and refinement of various affinity definitions. As a result of this strategy, a final linear system can be obtained, which can be solved in closed form. One embodiment pertains to identifying opacity information flows. The opacity information flow may include one or more of flows from pixels in the image that have similar colors to a target pixel, flows from pixels in the foreground and background to the target pixel, flows from pixels in the unknown opacity region in the image to the target pixel, flows from pixels immediately surrounding the target pixels in the image to the target pixel, and any other flow.

20 Claims, 6 Drawing Sheets

(51) Int. Cl.
G06T 7/90 (2017.01)
G06T 7/162 (2017.01)
G06T 7/187 (2017.01)

(52) U.S. Cl.
CPC ............ G06T 2207/10024 (2013.01); G06T 2207/20072 (2013.01)

(56) References Cited

U.S. PATENT DOCUMENTS

2012/0294519 A1* 11/2012 He .................. G06K 9/34 382/164
2017/0244908 A1* 8/2017 Flack ................ G06K 9/00234

OTHER PUBLICATIONS

Aksoy et al., "Unmixing-based soft color segmentation for image manipulation", ACM Trans. Graph., 2017.
Barrett et al., "Templates for the Solution of Linear Systems: Building Blocks for Iterative Methods", SIAM, 1994.
Chen et al., "KNN matting", IEEE Trans. Pattern Anal. Mach. Intell., 35(9), 2013,2175-2188.
Chen et al., "Image matting with local and nonlocal smooth priors", In Proc. CVPR, 2013.
Chen et al., "Manifold preserving edit propagation", ACM Trans. Graph., 31(6), 2012, 132:1-132:7.
Cho et al., "Natural image matting using deep convolutional neural networks", In Proc. ECCV, 2016.
Feng et al., "A cluster sampling method for image matting via sparse coding", In Proc. ECCV, 2016.
Gastal et al., "Shared sampling for real-time alpha matting", Comput. Graph. Forum, 29(2), 2010, 575-584.
Karacan et al., "Image matting with KL-divergence based sparse sampling", In Proc. ICCV, 2015.
Levin et al., "A closed form solution to natural image matting", IEEE Transactions on Pattern Analysis and Machine Intelligence, vol. 30, Issue 2, Feb. 2008, pp. 228-242.
Rhemann et al., "A perceptually motivated online benchmark for image matting", In Proc. CVPR, 2009.
Roweis et al., "Nonlinear dimensionality reduction by locally linear embedding", Science, 2000.
Shahrian et al., "Improving image matting using comprehensive sampling sets", In Proc. CVPR, 2013.
Wang et al., "Optimized color sampling for robust matting", IEEE Conference on Computer Vision and Pattern Recognition, CVPR 2007, Jun. 2007, pp. 1-8.
Zhu et al., "Targeting accurate object extraction from an image: A comprehensive study of", IEEE Trans. Neural Netw. Learn. Syst, 26(2), 2015, 185-207.

* cited by examiner

DESIGNING EFFECTIVE INTER-PIXEL INFORMATION FLOW FOR NATURAL IMAGE MATTING

CROSS-REFERENCES TO RELATED APPLICATIONS

This application claims priority to U.S. Provisional Patent Application No. 62/454,538, filed Feb. 3, 2017 and entitled "DESIGNING EFFECTIVE INTER-PIXEL INFORMATION FLOW FOR NATURAL IMAGE MATTING", the entire disclosure of which are hereby incorporated by referenced for all purposes.

BACKGROUND

Image matting refers to pixel estimation in images and video based on foreground and background image information. The matte defines which pixels are foreground, which are background. For pixels along the boundary or in semi-transparent regions such as hair, the matte defines the mixture of foreground and background at each pixel. Mathematically, image matting requires expressing pixel colors in the transition regions from foreground to background using a convex combination of their underlying foreground and background colors that formed the mixed-color pixel. The weight, or the opacity, of the foreground color is typically referred to as the alpha value of the pixel. Extracting the opacity information of foreground objects from an image is known as natural image matting.

The numerous natural matting methods in the literature can be mainly categorized as either sampling-based or affinity-based. Sampling-based methods typically propose a way of gathering numerous samples from the background and foreground regions defined by a trimap, and select the best-fitting pair according to their individually defined criteria to represent an unknown pixel as a mixture of foreground and background.

Affinity-based matting methods mainly make use of the pixel-similarity metrics that rely on color similarity or spatial proximity, and propagate the alpha values from regions with known opacity. Local affinity definitions look at a local patch around the pixel location to 20 determine the amount of local information flow, and propagate alpha values accordingly. The matting affinity is also widely adopted as a post-processing step in sampling-based methods. Methods utilizing non-local affinities also use color information in addition to spatial proximity for determining how the alpha values of different pixels should relate to each other.

There is also hybrid approach that uses the sampling-based robust matting as a starting point, and refines its outcome through a graph-based technique where they combine a non-local affinity and the local affinity.

BRIEF SUMMARY

Embodiments can provide a novel strategy for controlling information flow both from known trimap regions to unknown regions, as well as within the unknown region itself. This strategy is formulated through the use and refinement of various affinity definitions. Through this strategy, step-by-step improvement on the matte quality is achieved as the information flow is strengthened. As a result of this strategy, a final linear system can be obtained, which can be solved in closed form. This results in a matting quality improvement over the convention natural matting methods. The matting quality improvement can be seen both in a quantitative evaluation, and as well as through a visual inspection of challenging image regions.

One embodiment of the present disclosure pertains to generating images that can be displayed on a screen using an affinity-based algorithm in which pixel-to-pixel connections are carefully defined to enable effective use of information present in the trimap. The disclosed method controls the information flow from pixels having known opacity values into pixels having unknown opacity values based on color mixture relationships among these pixels.

One embodiment of the present disclosure pertains to identifying opacity information flows from pixels having known opacity values into a target pixel having an unknown opacity value. The opacity information flow may include one or more of flows from pixels in the image that have similar colors to the target pixel, flows from pixels in the foreground and background to the target pixel, flows from pixels in the unknown opacity region in the image to the target pixel, flows from pixels immediately surrounding the target pixels in the image to the target pixel, and any other flow. Based on one or more of these flows, a final energy function may be obtained and the opacity value for the target pixel may be solved by minimizing the energies in the final energy function.

Other embodiments are directed to systems and computer readable media associated with methods described herein.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION

Figure 1:
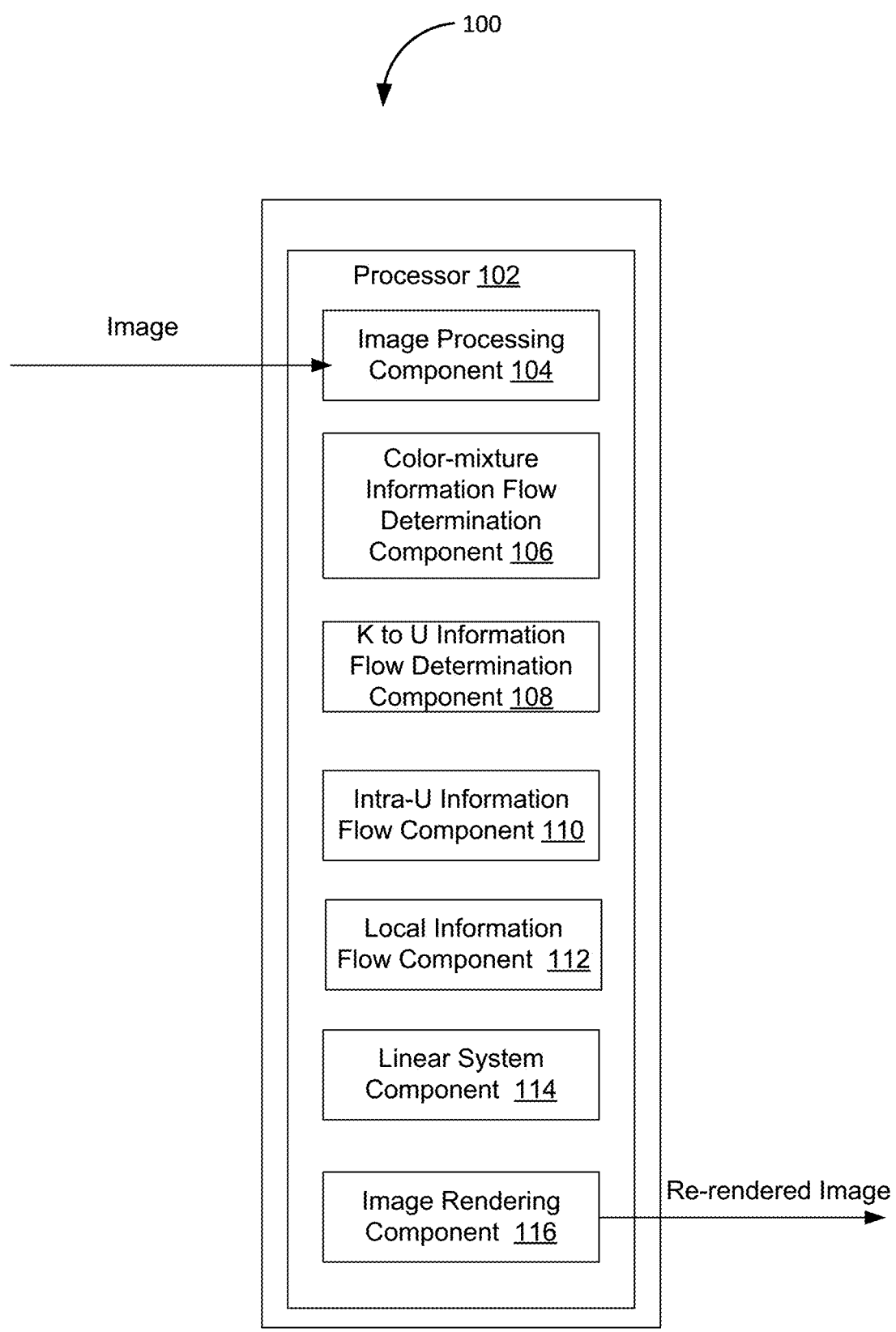
FIG. 1 illustrates generally a computer system for improved image matting in accordance with the disclosure.

The present disclosure generally relates to estimating unknown pixel information in computer graphics, particularly to natural image matting.

I. Overview of the Strategy in Accordance with the Disclosure

Trimaps, typically given as input together with the image itself for natural matting, can comprise three regions: fully opaque (foreground), fully transparent (background) and unknown opacity. These regions can be denoted as F, B and U, respectively. Further, K can be denoted as the union of F and B. Affinity-based methods operate by propagating opacity information from K into U using a variety of affinity definitions. The strategy for natural image matting in accordance with the disclosure is to define this flow of information in multiple ways so that all the pixels inside U receive effective information from different regions in the image. This strategy can be divided into several parts as described below.

First, the opacity transitions in a matte occur as a result of the original colors in the image getting mixed together due to transparency or intricate parts of an object. Based on this fact, each pixel in U can be represented as a mixture of similarly-colored pixels. A form of information flow, which may be referred to as color-mixture flow, can be defined using such pixels.

Second, connections from every pixel in U to both F and B can be added to facilitate direct information flow from known-opacity regions to unknown-opacity regions in the image. The unknown-opacity regions can include even the most remote opacity-transition regions in the image. The motivation for this part is that many pixels in U receive trimap information indirectly through their neighboring pixels, which may also be only in U Such indirection information flow may not be enough especially for remote regions that are far away from K.

Third, for distributing the information readily coming from the color-mixture (part 1) and K-to-U flows (part 2), intra-U flow of information can be defined. Under this flow, pixels with similar color inside U can share information on their opacity with each other.

Fourth, local information flow is performed. Under this flow, opacity information about a pixel is transferred to its immediate spatial neighbors. This can ensure spatially coherent end results for the matting.

Fifth, an energy function can be defined to represent one or more forms of information flow mentioned above. In such a function, these flows can be put together in an energy minimization formulation. The energy function can be solved for an improved matting over the traditional natural matting method.

II. An Example Implementation for Improving Natural Image Matting in Accordance with the Disclosure In this section, the individual parts of the strategy mentioned in section I are described in detail.

A. Color-Mixture Information Flow

Sensors typically have a finite resolution. Accordingly, transparent objects, or fine structures and sharp edges of an object, typically cannot be fully captured by the finite-resolution sensors. As a result, colors of some pixels in an image may appear as a mixture of its foreground and background colors. One aspect of some embodiments is that the mixing of colors of pixels can give an important clue on how to propagate alpha (opacity) values from pixel-to-pixel. The amount of the original foreground color in a particular mixture in a pixel can be used to determine the opacity of the pixel. Based on this, the color of a particular pixel can be represented as a weighted combination of the colors of several other pixels. The weights, as in the color mixture for the particular pixel, can also be used represent the opacity relation between the particular pixel and those pixels.

For using this color-mixture relation to determine the alpha value for a target pixel p in U, a K-nearest neighbor search can be performed for p. In one example, 20 similar pixels in a feature space (similar top) can be found through the K-nearest neighbor search. Although 20 is used here as illustration, this is not intended to be limiting. Embodiments of the disclosure are not limited to a particular number of pixels and thus other numbers of pixels can be used as may be appropriate in other embodiments. Such pixels can be denoted as $K_{CM}$ pixels. The feature vector for this search can be defined as $[r, g, b, \tilde{x}, \tilde{y}]^T$. In this feature vector, $\tilde{x}$ and $\tilde{y}$ are the image coordinates normalized by width or height of the image, and the rest are the RGB values of the target pixel. This set of neighbors, selected as similar-colored pixels that are also near p, can be denoted by $N_p^{CM}$. color when combined:

The weights of the weighted combination can be denoted as $W_{p,q}^{CM}$. As mentioned above, $W_{p,q}^{CM}$ can be used to determine the amount of information that can flow between p and $q \in N_p^{CM}$. These weights can be computed using the following equation based on that the colors of the neighbors of a pixel gives the original pixel color when combined:

$$\underset{w_{p,q}^{CM}}{\operatorname{argmin}} \left\| c_p - \sum_{q \in N_p^{CM}} w_{p,q}^{CM} c_q \right\|^2, \quad (1)$$

In equation 1, $C_p$ represents a 3×1 vector RGB values. It should be noted that since only RGB values are used, the neighborhood correlation matrix computed during the minimization has a high chance of being singular as there could easily be two neighbors with identical colors. In implementations, the neighborhood correlation matrix can be conditioned by adding a $10^{-3}$ $I_{3\times3}$ to the matrix before inversion. The $I_{3\times3}$ is an identity matrix.

Although, one skilled in the art may recognize that the energy is minimized in equation 1 through a method introduced by Roweis and Saul (see appendix [14] for the reference article, which is incorporated herein by reference), it should be understood any other suitable method may be used. The Roswies and Saul method may be categorized as a local linear embedding (LLE) method. LLE finds a set of neighbors in a feature space and uses all the variables in the feature space to find the weights in order to reduce the dimensionality of input data. Manifold-preserving edit propagation (see appendix [3] for the reference article, which is incorporated herein by reference) and LNSP matting (see appendix [4] for the reference article, which is incorporated herein by reference) algorithms make use of the LLE weights directly in their formulation for image matting. These methods may also be used to find $W_{p,q}^{CM}$ in some other examples. It should also be noted that, since the interest is in finding the weighted combination of colors, not the spatial coordinates, the spatial coordinates in the energy minimization equation, such as equation 1 shown here.

Based on equation 1, the energy term representing the color-mixture information flow can be defined using the following equation:

$$E_{CM} = \sum_{p \in \mathcal{U}} \left( \alpha_p - \sum_{q \in N_p^{CM}} w_{p,q}^{CM} \alpha_q \right)^2. \quad (2)$$

B. K to U Information Flow

While the color-mixture flow provides information on how the mixed-color pixels are formed, many pixels in U receive information in the trimap indirectly through their neighbors which can also be only in U. This indirect information flow might not be enough especially for remote regions that are far away from K. In order to facilitate the flow of information from both F and B directly into every region in U, connections from individual pixels in U to K can be added. For p in the U, similar pixels in F and B can be found through another K-nearest neighbor search. In this example, as illustration, 7 such pixels may be found to form the sets of pixels $N_p^F$ and $N_p^B$. These pixels can be denoted as Kku. The pixels in $N_p^F$ and $N_p^B$ can be used together to represent the pixel color $C_p$ by minimizing the energy in equation 1. With the resulting weights $W_{p,q}^F$ and $W_{p,q}^B$, an equation representing the information flow from K to U can be defined as follows:

$$E_{\mathcal{KU}} = \sum_{p \in \mathcal{U}} \left( \alpha_p - \sum_{q \in N_p^F} w_{p,q}^F \alpha_q - \sum_{q \in N_p^B} w_{p,q}^B \alpha_q \right)^2 \quad (3)$$

Note that $\alpha_q=1$ for $q \in F$ and $\alpha_q=0$ for $q \in B$. This fact allows defining two combined weights, one connecting to F and another connecting to B as the following equation:

$$w_p^{\mathcal{F}} = \sum_{q \in N_p^F} w_{p,q}^{\mathcal{F}} \text{ and } w_p^{\mathcal{B}} = \sum_{q \in N_p^B} w_{p,q}^{\mathcal{B}} \quad (4)$$

such that $W_p^F + W_p^B = 1$. Equation 3 can then be rewritten as the following equation:

$$E_{\mathcal{KU}} = \sum_{p \in \mathcal{U}} (\alpha_p - w_p^{\mathcal{F}})^2. \quad (5)$$

The energy minimization in equation 1 provides similar weights for all q when $C_q$ are similar to each other. As a result, if $N_p^F$ and $N_p^B$ have pixels with similar colors, the estimated weights $W_p^F$ and $W_p^B$ may become unreliable. This can be addressed by augmenting the energy function in equation 5 with confidence values.

One example of using such confidence values to augment equation 6 is described below. Other examples are contemplated. In this example, the colors contributing to the mixture estimated by equation 1 can be defined using weights $W_{p,q}^F$ and $W_{p,q}^B$ through the following equation:

$$c_p^{\mathcal{F}} = \frac{\sum_{q \in N_p^F} w_{p,q}^{\mathcal{F}} c_q}{w_p^{\mathcal{F}}}, c_p^{\mathcal{B}} = \frac{\sum_{q \in N_p^B} w_{p,q}^{\mathcal{B}} c_q}{w_p^{\mathcal{B}}}, \quad (6)$$

A confidence metric can be defined according to how similar the estimated foreground color $C_p^F$ and background color $C_p^B$ using the following equation:

$$\eta_p = \| c_p^{\mathcal{F}} - c_p^{\mathcal{B}} \|^2 / 3 \quad (7)$$

The division by 3 is to obtain the confidence values between [0; 1]. The new combination energy term can then be updated to reflect our confidence in the estimation:

$$\tilde{E}_{\mathcal{KU}} = \sum_{p \in \mathcal{U}} \eta_p (\alpha_p - w_{p,\mathcal{F}}^C)^2. \quad (8)$$

This update to the energy term increases the matting quality in regions with similar foreground and background colors.

1. Pre-Processing the Trimap

In some embodiments, prior to determining $N_p^F$ and $N_p^B$, the input trimap can be processed to facilitate finding more reliable neighbors. This can increase the effectiveness of K to U information flow. Trimaps typically have regions marked as U despite being fully opaque or transparent, as drawing a very detailed trimap is a very cumbersome and error-prone job. Several methods (see appendix [7] and [10] for the reference articles describing such methods; these references are incorporated herein by reference), refine the trimap as a pre-processing step by expanding F and B starting from their boundaries with U as proposed by Sharhrian et al. (See appendix [16] for the reference article, which is incorporated herein by reference). Such a step can improve the matting result.

In some examples, the extended F and B value may also be applied after the matte estimation as a post-processing step. However, it should be noted trimming the trimap this way may only extend the known regions to nearby pixels. In addition to this edge-based trimming, we a patch-based trimming step may be used for improvements. For example, for determining the transparent or opaque regions as a pre-processing step, patch statistics can be used. In that example, a 3D RGB normal distribution can be fit to a 3×3 window around individual pixels denoted by $N_p$ for a pixel p. For determining the most similar distribution in F for a pixel in U, certain number (e.g., 20) of distributions can be found with mean closest mean vectors. A foreground match can be defined as $b_p^f = \min_{q \in F} B(N_p, N_q)$, where B(.,.) represents the Bhattacharyya distance between two normal distributions. The match score for background $b_p^B$ may be found in the same way. A region for pixel p can then be selected according the following equation:

$$p \in \begin{cases} \hat{\mathcal{F}} & \text{if } b_p^{\mathcal{F}} < \tau_c \text{ and } b_p^{\mathcal{B}} > \tau_f \\ \hat{\mathcal{B}} & \text{if } b_p^{\mathcal{B}} < \tau_c \text{ and } b_p^{\mathcal{F}} > \tau_f \\ \hat{\mathcal{U}} & \text{otherwise} \end{cases} \quad (9)$$

That is, an unknown pixel can be marked as $\hat{\mathcal{F}}$, i.e. in foreground after trimming, if it has a strong match in F and no match in B, which is determined by constants $\tau_c=0.25$ and $\tau_f=0.9$. By inserting known-alpha pixels in regions far away from U-K boundaries, the matting performance in challenging remote regions can be increased.

C. Intra-U Information Flow

As described above, individual pixels in U can receive opacity information through the color-mixture and/or K to U flows. In addition to these flows, information within U may also be distributed. This can be achieved by encouraging pixels with similar colors inside U to have similar opacity information. In some embodiments, for achieving this, another K-nearest neighbor search may be performed only inside U to determine $N_p^U$. In one example, 5 such pixels can be found using a feature factor defined as $[r,g,b,\hat{x},\hat{y}]^T$, where $\hat{x} = \tilde{x}/20$ and $\hat{y} = \tilde{y}/20$. That is, the coordinate members of the feature vectors used in section II. A can be scaled to decrease their effect on the nearest neighbor selection. This lets $N^U$ have pixels inside U that is far away, so that the information moves more freely inside the unknown region. The amount of information flow can then be determined using the $L^1$ distance between feature vectors using the following equation:

$$w_{p,q}^{\mathcal{U}} = 1 - \frac{|f_p - f_q|_1}{f_s} \forall\, p \in \mathcal{U}, \forall\, q \in \mathcal{N}_p^{\mathcal{U}}, \tag{10}$$

In this equation, $f_s$ is a normalization factor to keep $w^U$ values in [0, 1]. The energy term for intra-U information flow can then be defined as:

$$E_{\mathcal{UU}} = \sum_{p \in \mathcal{U}} \sum_{q \in \mathcal{N}_p^{\mathcal{U}}} w_{p,q}^{\mathcal{U}} (\alpha_p - \alpha_q)^2. \tag{11}$$

This sharing of information amongst the unknown pixels increase the matte quality in intricate regions.

It should be noted KNN matting introduced by Chen and Tang (see appendix [2] for the reference article), uses a similar affinity definition to make similar-color pixels have similar opacities. However, relying only on this form of information flow alone for the whole image creates some typical artifacts in the resulting alpha mattes. For example, depending on the feature vector definition and the image colors, the resulting alpha values may erroneously underrepresent the smooth transitions when the neighbors of the pixels in U happen to be mostly in only F or B, or create flat constant alpha regions instead of subtle gradients. This is because information flow only by enforcing similar values for similar pixels typically fail to represent the complex alpha transitions or wide regions with an alpha gradient.

D. Local Information Flow

One of the fundamental flows of information is in-between the spatially connected pixels. We connect each pixel in U to its 8 immediate neighbors denoted by $N^L$ to ensure spatially smooth mattes. The amount of local information flow should also adapt to strong edges in the image. In some embodiments, the amount of local flow can be determined by relying on the matting affinity definition proposed by Levin et al (see appendix [11] for the reference article, which is incorporated herein by reference). The matting affinity relies on the local patch statistics to determine the weights $W_{p,q}^L$, $q \in N^L$. The related energy term following Levin at el can be defined as the following equation:

$$E_L = \sum_{p \in \mathcal{U}} \sum_{q \in \mathcal{N}_p^L} w_{p,q}^L (\alpha_p - \alpha_q)^2. \tag{12}$$

Despite representing local information flow well, matting affinity is not enough to represent large transition regions, or isolated regions that have weak or no spatial connection to F or B by itself.

E. Linear System and Energy Minimization

One or more energy terms described in section II. A-D above may be combined to obtain a final energy function for natural image matting. For example, the following equation may be obtained:

$$E_1 = E_{CM} + \sigma_{KU} E_{KU} + \sigma_{UU} E_{UU} + \sigma_L E_L + \lambda E_v, \tag{13}$$

It should be understood, equation 13 is merely for illustration. As mentioned, in some other examples, the energy function $E_1$ may include less than the energy terms shown above. For instance, it is contemplated the energy function $E_1$ may not have $E_{CM}$ term in some other example.

In this example, in the equation 13, $\sigma KU=0.05$, $\sigma UU=0.01$, $\sigma L=1$ and $\lambda=100$ are algorithmic constants determining the strength of corresponding information flows. In equation 13 above, $E_T$ is the energy term to keep the known opacity values constant and can be defined as the following:

$$E_T = \sum_{p \in \mathcal{F}} (\alpha_p - 1)^2 + \sum_{p \in \mathcal{B}} (\alpha_p - 0)^2$$

For an image with N pixels, by defining N×N sparse matrices $W_{CM}$, $W_{UU}$ and $W_L$ that have non-zero elements for the pixel pairs with corresponding information flows and the vector $w^F$ that has elements $w^F$ for $p \in U$, 1 for $p \in F$ and 0 for $p \in B$, equation 13 can be rewritten in matrix form as follows:

$$E_1 = \alpha^T \mathcal{L}_{LSC} \alpha + (\alpha - w^{\mathcal{F}})^T \sigma_{\mathcal{KU}} H(\alpha - w^{\mathcal{F}}) + (\alpha - \alpha_{\mathcal{K}})^T \lambda \mathcal{T}(\alpha - \alpha_{\mathcal{K}}), \tag{14}$$

In equation 14, T is an N×N diagonal matrix with diagonal entry (p,p) 1 if $p \in K$ and 0 otherwise; H is a sparse matrix with diagonal entries $\eta_p$ as defined in equation 7, $\alpha_K$ is a row vector with $p^{th}$ entry being 1 if $p \in F$ and 0 otherwise; and $\alpha$ is a row-vector of the alpha values to be estimated. $L_{LSC}$ can be defined as:

$$\mathcal{L}_{LSC} = (I - W_{CM})^T (I - W_{CM}) + \sigma_{UU}(I - W_{UU}) + \sigma_L(I - W_L). \tag{15}$$

The energy in equation 14 can be minimized by solving:

$$(\mathcal{L}_{LSC} + \lambda \tau + \sigma_{\mathcal{KU}} \hat{\mathcal{H}}) \alpha = (\lambda \tau + \sigma_{\mathcal{KU}} \hat{\mathcal{H}}) w^{\mathcal{F}}. \tag{16}$$

A second energy function that excludes the K to U information flow:

$$E_2 = E_{CM} + \sigma_{UU} E_{UU} + \sigma_L E_L + \lambda E_v, \tag{17}$$

Equation 17 can rewritten in matrix form as:

$$E_2 = \alpha^T \mathcal{L}_{LSC} \alpha + (\alpha - \alpha_{\mathcal{K}})^T \lambda \tau (\alpha - \alpha_{\mathcal{K}}), \tag{18}$$

Equation 18 can minimized by solving the following:

$$(\mathcal{L}_{LSC} + \lambda \tau) \alpha = \lambda \tau \alpha_{\mathcal{K}}. \tag{19}$$

In one exemplary implementation, the linear systems of equation 16 and equation 19 are solved using a preconditioned conjugate gradients method introduced by Berry et al. (see appendix [1] for the reference article, which is incorporated herein by reference).

As mentioned before, in some situations, K-to-U information flow is not effective for highly transparent objects. To determine whether to include K-to-U information flow and solve for E1, or to exclude it and solve for E2 for a given image, a simple histogram-based classifier can be used to determine if a highly transparent result is expected.

1. Histogram-Based Classifier

If the matte is highly transparent, the pixels in U are expected to mostly have colors that are a mixture of F and B colors. On the other hand, if the true alpha values are mostly 0 or 1 except for soft transitions, the histogram of U will likely be a linear combination of the histograms of F and B as U will mostly include very similar colors to that of K. Following this observation, the histogram of the pixels in U, $D_U$, can be expressed as a linear combination of $D_F$ and $D_B$, which are computed from the 20 pixel-wide region around U in F and B, respectively. Let's define the error e, the metric of how well the linear combination represents the true histogram as:

$$e = \min_{a,b} \|a\mathcal{D}_F + b\mathcal{D}_B - \mathcal{D}_\mathcal{U}\|^2. \qquad (20)$$

Higher θ values indicate a highly-transparent matte such as the net and the plastic bag images in the alpha matting benchmark, in which case $E_2$ can be used. Otherwise $E_1$ can be used.

F. Post Processing—Matte Refinement for Sampling-Based Matting Methods

Sampling-based natural matting methods usually select samples for each pixel in U independently or with little spatial coherency measures. In order to get a spatially coherent matte, the common practice is to combine their initial guesses for alpha values with a smoothness measure. Many methods (see appendix [7, 8, 10, 16] for references) adopt the post-processing method proposed by Gastal and Oliveira (see appendix [8] for the reference article, which is incorporated herein by reference) which combines the matting affinity (see appendix [11] for the reference article, which is incorporated herein by reference) with the sampling-based alpha values and corresponding confidences. While this post-processing improves the mattes, as it only includes a local smoothness cost, the results may be suboptimal.

In some embodiments, the multiple forms of information flow described and illustrated herein can used for post-processing in a system similar to that of Gastal and Oliveira (see appendix [8] for the reference article, which is incorporated herein by reference). Given the initial alpha value $\hat{\alpha}$ and confidences $\hat{\eta}_p$ found by a sampling-based method, the matte regularization energy can be defined as:

$$E_R = E_2 + \sigma_R \sum_{p \in \mathcal{U}} \hat{\eta}_p (\alpha_p - \hat{\alpha}_p)^2. \qquad (21)$$

In equation 21, σ=0.05 determines how much loyalty should be given to the initial values. This energy can be written in the matrix form as:

$$E_R = \alpha^T \mathcal{L}_{LSC} \alpha + (\alpha - \hat{\alpha})^T \sigma_R \hat{\mathcal{H}} (\alpha - \hat{\alpha}) + (\alpha - \alpha_\mathcal{K})^T \lambda \mathcal{T} (\alpha - \alpha_\mathcal{K}) \qquad (22)$$

Equation 22 can be minimized by solving:

$$(\mathcal{L}_{LSC} + \lambda \mathcal{T} + \sigma_R \hat{\mathcal{H}}) \alpha = (\lambda \mathcal{T} + \sigma_R \hat{\mathcal{H}}) \hat{\alpha}. \qquad (23)$$

This non-local regularization of mattes is more effective especially around challenging foreground structures such as long leaves or holes as seen in the insets.

III. A System for Improved Image Matting in Accordance with the Disclosure

FIG. 1 illustrates generally a computer system 100 for improved image matting in accordance with the disclosure. As shown, system 100 can include one or more of a processor 102 configured to implement computer program components, which can include image processing component 104, a color-mixture information flow determination component 106, a K to U information flow determination component 108, an intra-U Information flow component 110, a local information flow component 112, a linear system component 114, an image rendering component 116 and/or any other components.

Figure 2:
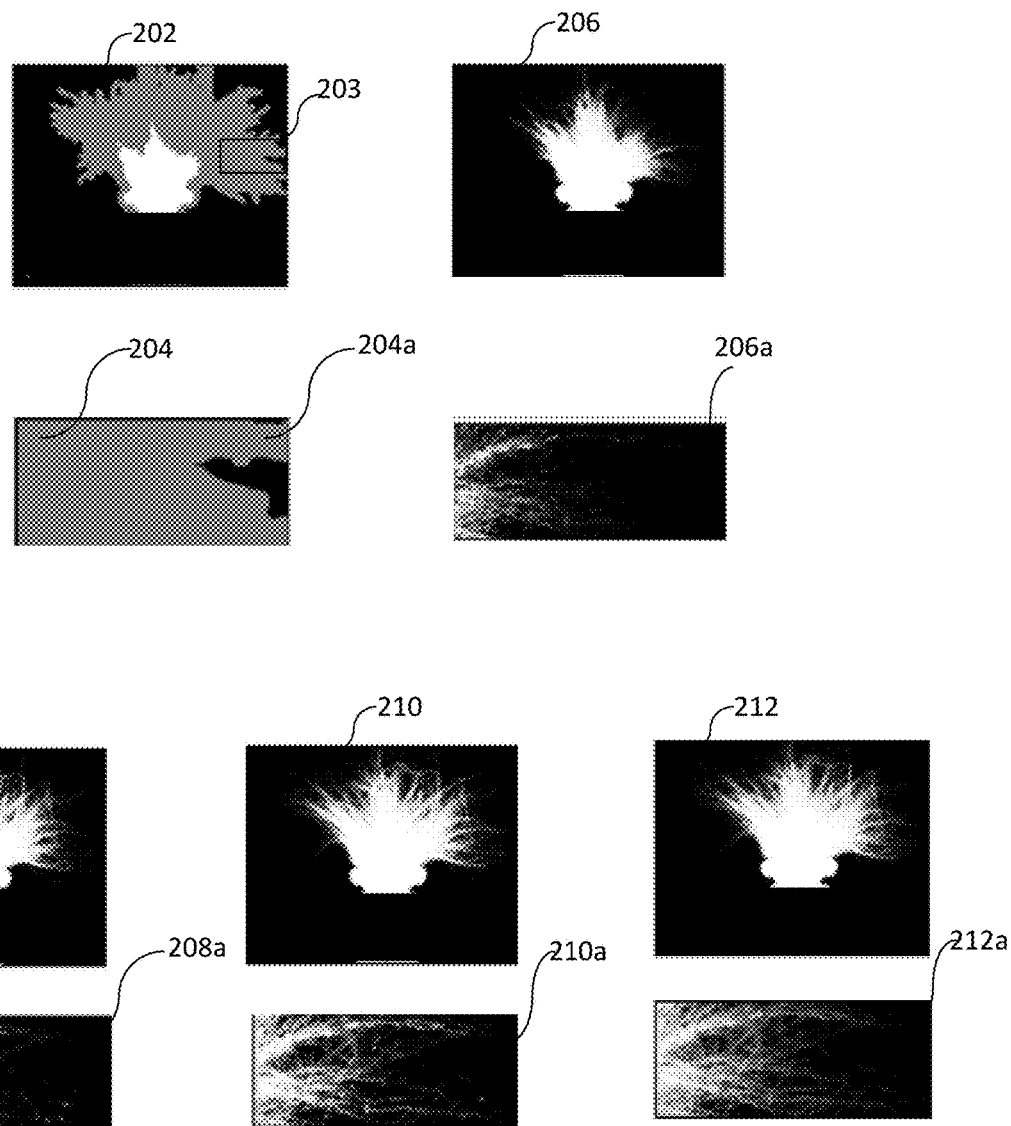
FIG. 2 illustrates various images having estimated opacity information based on one or more information flows described herein.

The image processing component 104 can be configured to obtain regions an image. The regions obtained by the image processing component 104 can include a foreground region, a background region, an unknown region, and/or any other regions. As mentioned above, the foreground region may be a region in the image where the pixels have an opacity value (alpha value) of 1, and the background may be a region in the image where the pixels have an opacity value of 0. The unknown region may be a region in the image where the pixels have an unknown opacity value, which may be between 0 and 1. As shown in FIG. 2, an image 202 may have a trimap 204. As also shown the image 202 can have a region (corresponding to a portion 204a in trimap) where opacity information is unknown.

Refer back to FIG. 1. The color-mixture information flow determination component 106 can be configured to identify a first set of pixels that have colors similar to a target pixel in the unknown region obtained by the image processing component 104. As mentioned above, the color of the target pixel can be represented as a weighted combination of the colors of several other pixels. As described above in section II. A above, this may involve performing a K-nearest neighbor search in the entire image for the target pixels to identify a set of similar colored pixel to the target pixel. Details of possible implementations are described in in section II. A. For instance, 20 pixels may be identified in the image such that these pixels have colors similar to the target pixel. A color of the target pixel may be represented as a weighted mixture of colors of these pixels.

The color-mixture information flow determination component 106 can be configured to determine a first amount of opacity information flow from the first set of pixels to the target pixel. As detailed in section II. A above, in some embodiments, this may involve determining a weight for the individual pixels in the first set with respect to its color contribution to the mixture of colors representing the color of the target pixel. In those embodiments, the weights of the individual pixels can be combined to obtain a combined weight. As also detailed in section II. A above, the determination of the second amount information flow can be based on this combined weight.

The K to U information flow determination component 108 can be configured to identify a second set of pixels and/or a third set of pixels, the second set of pixels. As detailed above in section II. B, the second set of pixels may be from the foreground region obtained by the image processing component 104; and the third set of pixels may be from the background region obtained by image processing component 104. As also described above in section II. B above, identification of the second set and/or third set of pixels may involve performing a K-nearest neighbor search in the foreground and/or background of the image respectively for the target pixel. Details of possible implementations are described in in section II. B. For instance, 7 pixels may be identified in the foreground and 7 pixels may be identified in the background separately such that these pixels have colors similar to the target pixel. A color of the target pixel may be represented as a weighted mixture of colors of these pixels.

The K to U information flow determination component 108 can be configured to determine a second amount of opacity information flow from the second set and third set of pixels to the target pixel. As detailed in section II. B above, in some embodiments, this may involve determining a first combined weight for the pixels in the second set with respect to the target pixel. The first combined weight is a weight that connects the target pixel to the foreground and indicates color contribution by the second set of pixels to the color of the target pixel. Similarly, a second combined weight can be determined for the pixels in the third set with respect to the target pixel and indicates color contribution by the third set of pixels to the color of the target pixel. The second combined weight is a weight that connects the target pixel to the background. As also detailed in section II. B above, the determination of the second amount information flow can be based on the first combined weight and the second combined weight.

The Intra-U information flow component 110 can be configured to identify a fourth set of pixels from the unknown region of image as obtained by the image processing component 104. The pixels in the fourth set have colors similar to the target pixel. As described above in section II. C above, identification of the fourth set of pixels may involve performing a K-nearest neighbor search in the unknown region of the image for the target pixel. Details of possible implementations are described in in section II. C. For instance, 5 pixels may be identified in the unknown region such that these pixels have colors similar to the target pixel. A color of the target pixel may be represented as a weighted mixture of colors of these pixels.

The Intra-U information flow component 110 can be configured to determine a third amount of opacity information flow from the fourth set of pixels to the target pixel. As detailed in section II. C above, in some embodiments, this may involve determining a third combined weight for the pixels in the fourth set with respect to the target pixel. The third combined weight indicates color contribution by the third set of pixels to the color of the target pixel. As also detailed in section II. C above, the determination of the third amount information flow can be based on the third combined weight.

The local information flow component 112 can be configured to identify a fifth set of pixels. The pixels in the fifth set are immediate neighbors to the target pixel in the image. Details of possible implementations are described in in section II. D. For instance, 8 pixels may be identified such that these pixels are immediate neighbors surrounding the target pixels. A color of the target pixel may be represented as a weighted mixture of colors of these pixels.

The local information flow component 112 can be configured to determine a fourth amount of opacity information flow from the first set of pixels to the target pixel. As detailed in section II. D above, in some embodiments, this may involve determining a fourth combined weight for the pixels in the fifth set with respect to the target pixel. The fourth combined weight indicates color contribution by the fifth set of pixels to the color of the target pixel. As also detailed in section II. D above, the determination of the fourth amount information flow can be based on the fourth combined weight.

The linear system component 114 can be configured to estimate the opacity value for the target pixel based on one more of the first amount of opacity information flow, the second amount of opacity information flow, the third amount of opacity information flow and the fourth amount of opacity information flow. In some embodiments, the operation(s) performed by linear system component 114 may involve obtaining a final energy function by combining one or more of the energy terms (information flows) represented by the first, second, third, and fourth amount of opacity information flow. In some embodiments, as detailed in section II. E above, this may involve minimizing the energy function to solve the opacity value for the target pixel.

The image rendering component 116 can be configured to re-render the image obtained by the image processing component 104 using the opacity information estimated for one or more target pixels by the linear system component 114. FIG. 2 illustrates various image having estimated opacity information based on one or more information flows described herein. As mentioned above, image 202 shown in FIG. 2 is an image that may have unknown region(s) with unknown opacity information in the region(s). Region 204 is such a region. Image 202 may have a trimap 204 which may contain color information and opacity information for pixels in image 202. Some pixels in image 202 may not have opacity information—for example, 204a is a portion in the trimap corresponding to region 202a and as can be seen, there is no opacity information for the character's hair in region 202a. 206 is an image that can be rendered by the image rendering component 116 based on the color-mixture flow that can be determined by the color-mixture information flow determination component 106 as described and illustrated herein. As can be seen, improved resulting opacity can be achieved for region 206a in the trimap.

208 is an image that can be rendered by the image rendering component 116 based on the K to U flow that can be determined by K to U information flow determination component 108 as described and illustrated herein. As can be seen, improved resulting opacity can be achieved for region 208a in the trimap.

210 is a trimap corresponding to an image that can be rendered by the image rendering component 116 based on the Intra-U information flow that can be determined by K Intra-U information flow component 110 as described and illustrated herein. As can be seen, improved resulting opacity can be achieved for region 210a in the trimap.

212 is a trimap corresponding to an image that can be rendered by the image rendering component 116 based on the location information flow that can be determined by local information flow component 112 as described and illustrated herein. As can be seen, improved resulting opacity can be achieved for region 212a in the trimap.

IV. A Method for Improved Image Matting in Accordance with the Disclosure

Figure 3:
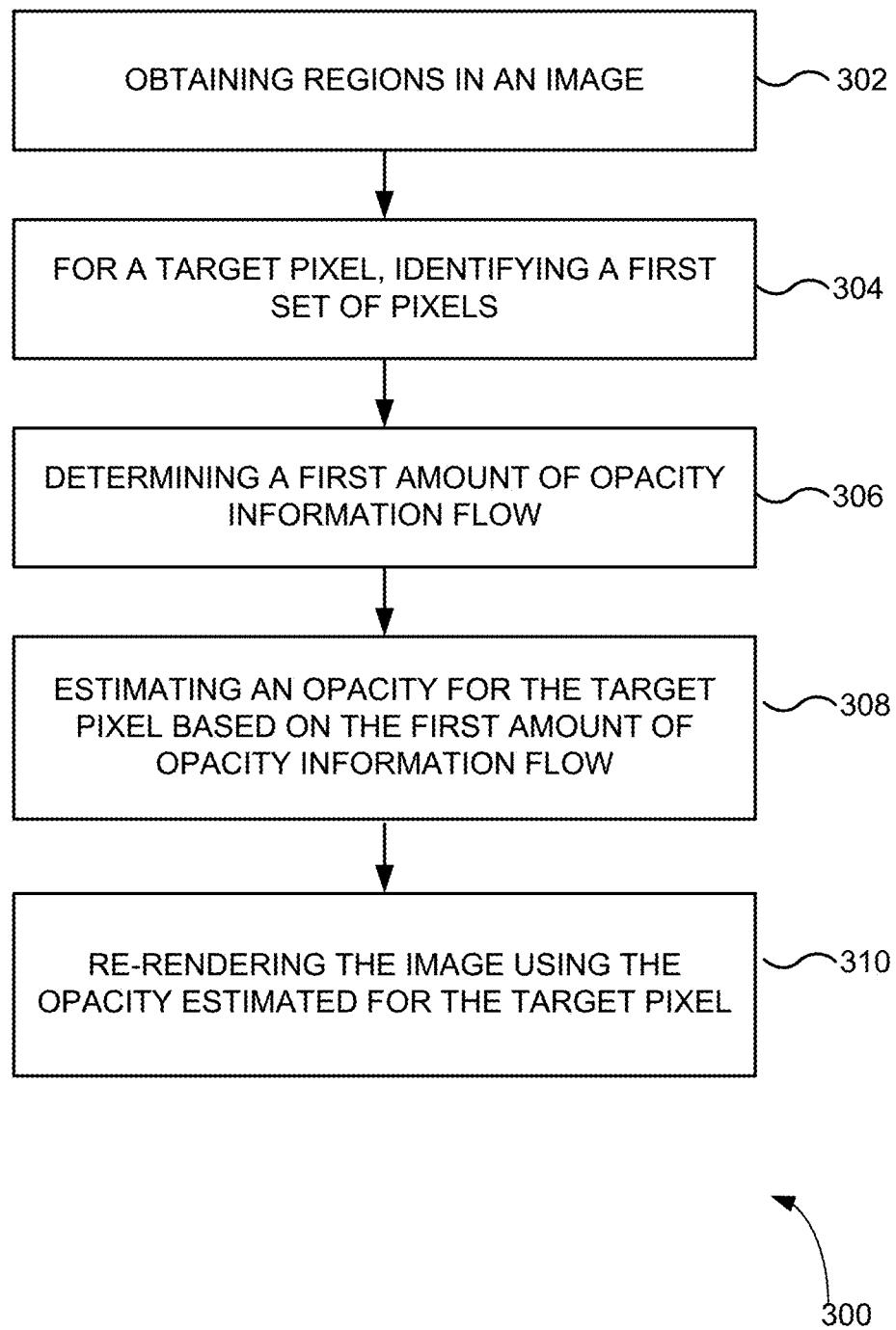
FIG. 3 illustrates a exemplary method for improved image matting in accordance with the disclosure.

FIG. 3 illustrates a exemplary method for improved image matting in accordance with the disclosure. The method presented in FIG. 3 and described below is intended to be illustrative and non-limiting. The particular series of processing steps depicted in FIG. 3 is not intended to be limiting. It is appreciated that the processing steps may be performed in an order different from that depicted in FIG. 3 and that not all the steps depicted in FIG. 3 need be performed. In certain implementations, the method 300 may be implemented by a computer system, such as the computer system 100 shown in FIG. 1.

In some embodiments, the method depicted in method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At 302, regions within an image may be obtained. The regions obtained at 302 may include a foreground region, a background region, an unknown region, and/or any other regions. As mentioned above, the foreground region may be a region in the image where the pixels have an opacity value (alpha value) of 1, and the background may be a region in the image where the pixels have an opacity value of 0. The unknown region may be a region in the image where the pixels have an unknown opacity value, which may be between 0 and 1. An example of such an image is image 202 shown in FIG. 2. In some exemplary implementations, 302 may be implemented by image processing component the same as or substantially to the image processing component 104 as described and illustrated herein.

At 304, for a target pixel having an unknown opacity value in the image, a first set of pixels can be identified. The pixels in the first set may be identified such that they have colors similar to a target pixel. As mentioned above, the color of the target pixel can be represented as a weighted combination of the colors of such pixels. In some exemplary implementations, 304 may be implemented by color-mixture information flow determination component the same as or substantially to the color-mixture information flow determination component 106 as described and illustrated herein.

At 306, a first amount of opacity information flow can be determined. The first amount of opacity information flow indicates how much opacity information may flow from the first set of pixels to the target pixel. The operation(s) performed at 306 may involve determining a weight for the individual pixels in the first set with respect to its color contribution to the mixture of colors representing the color of the target pixel. In some embodiments, the weights of the individual pixels can be combined to obtain a combined weight for determining the first amount of opacity information flow. In some exemplary implementations, 306 may be implemented by color-mixture information flow determination component the same as or substantially to the color-mixture information flow determination component 106 as described and illustrated herein.

At 308, an opacity value may be estimated for the target pixel based on the first amount of opacity information flow determined at 306. As mentioned above, this may involve solving an energy function with an energy term reflecting the first amount of opacity information flow. In some exemplary implementations, 308 may be implemented by linear system component the same as or substantially to the linear system component 114 as described and illustrated herein.

At 310, the image obtained at 302 may be re-rendered based on the opacity information for the target pixel estimated at 308. Image 206 in FIG. 2 is an example of such an image that is re-rendered at 310. In some exemplary implementations, 310 may be implemented by image rendering component 116 the same as or substantially to the image rendering component 116 as described and illustrated herein.

Figure 4:
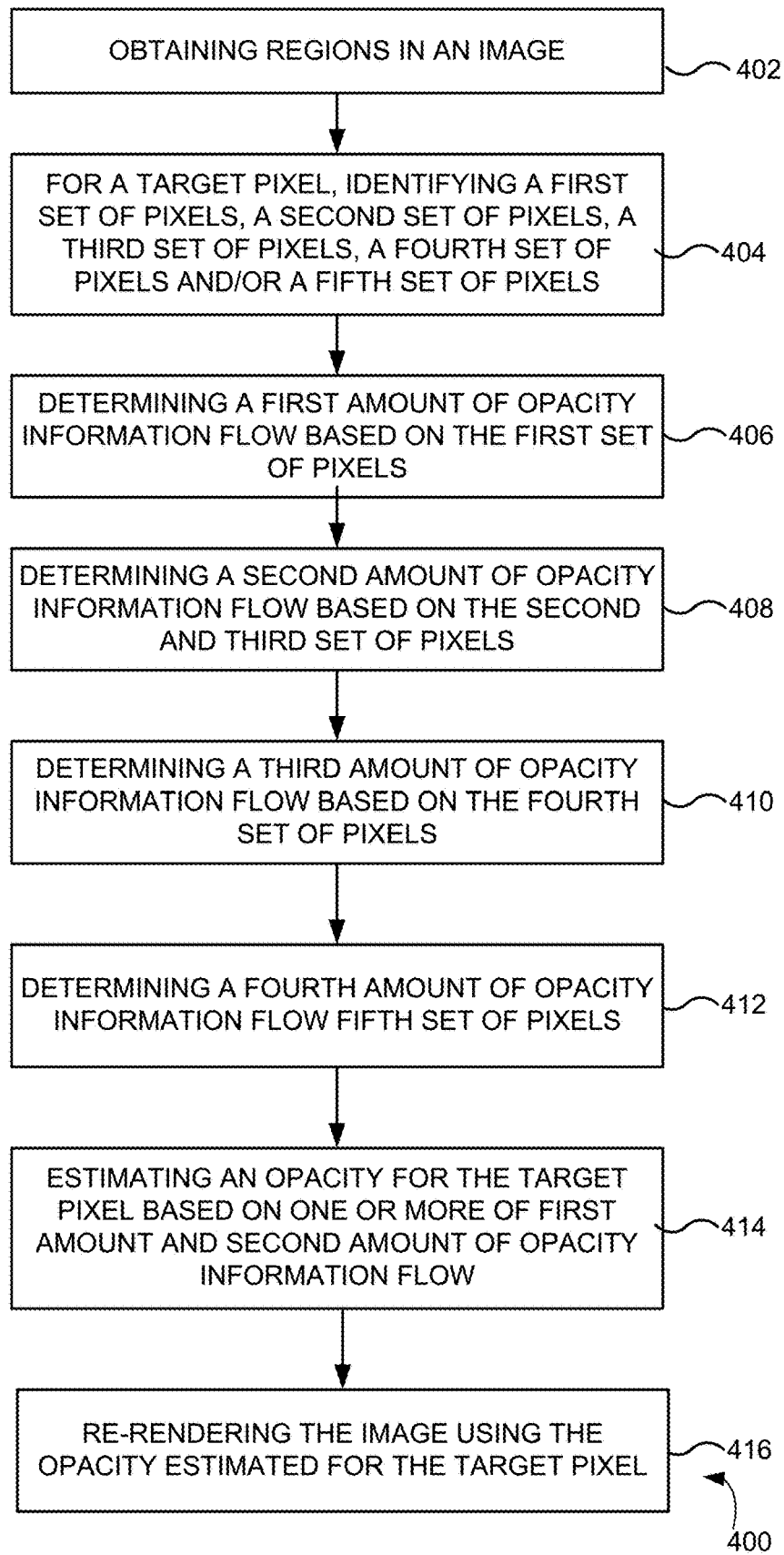
FIG. 4 illustrates another exemplary method for improved image matting in accordance with the disclosure.

FIG. 4 illustrates another exemplary method for improved image matting in accordance with the disclosure. The method presented in FIG. 4 and described below is intended to be illustrative and non-limiting. The particular series of processing steps depicted in FIG. 4 is not intended to be limiting. It is appreciated that the processing steps may be performed in an order different from that depicted in FIG. 4 and that not all the steps depicted in FIG. 4 need be performed. In certain implementations, the method 400 may be implemented by a computer system, such as the computer system 100 shown in FIG. 1.

In some embodiments, the method depicted in method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At 402, regions within an image may be obtained. The regions obtained at 403 may include a foreground region, a background region, an unknown region, and/or any other regions. As mentioned above, the foreground region may be a region in the image where the pixels have an opacity value (alpha value) of 1, and the background may be a region in the image where the pixels have an opacity value of 0. The unknown region may be a region in the image where the pixels have an unknown opacity value, which may be between 0 and 1. An example of such an image is image 202 shown in FIG. 2. In some exemplary implementations, 402 may be implemented by image processing component the same as or substantially to the image processing component 104 as described and illustrated herein.

At 404, a first set, a second, a third set, a fourth and/or a fifth set of pixels can be identified for a target pixel having an unknown opacity value in the image. The pixels in the first set may be identified in the entire image such that they have colors similar to a target pixel. The pixels in the second set and in the third set may be identified only in the foreground and background, respectively, such that they have colors similar to the target pixel. The pixels in the third set may be identified in the unknown region of the image such that they have colors similar to the target pixel. The pixels in the fifth set may be identified such that they are immediate neighbors surrounding the target pixel in the image. As mentioned above, the color of the target pixel can be represented as a weighted combination of the colors of these pixels. In some exemplary implementations, 404 may be implemented by color-mixture information flow determination component the same as or substantially to the color-mixture information flow determination component 106 as described and illustrated herein.

At 406, a first amount of opacity information flow can be determined. The first amount of opacity information flow indicates how much opacity information may flow from the first set of pixels to the target pixel. The operation(s) performed at 406 may involve determining a weight for the individual pixels in the first set with respect to its color contribution to the mixture of colors representing the color of the target pixel. In some embodiments, the weights of the individual pixels can be combined to obtain a combined weight for determining the first amount of opacity information flow. In some exemplary implementations, 406 may be implemented by color-mixture information flow determination component the same as or substantially to the color-mixture information flow determination component 106 as described and illustrated herein.

At 408, a second amount of opacity information flow can be determined. The second amount of opacity information flow indicates how much opacity information may flow from the second set and third of pixels to the target pixel. The operation(s) performed at 408 may involve determining a weight for the individual pixels in the second set and third set with respect to its color contribution to the mixture of colors representing the color of the target pixel. In some embodiments, the weights of the individual pixels in the second set can be combined to obtain a first combined weight; and the weights of the individual pixels in the third set can be combined to obtain a second combined weight. In those embodiments, the second amount of opacity information flow can be determined based on the first and second combined weights. In some exemplary implementations, 408 may be implemented by K to U information flow determination component the same as or substantially to K to U information flow determination component 108 as described and illustrated herein.

At 410, a third amount of opacity information flow can be determined. The third amount of opacity information flow indicates how much opacity information may flow from the fourth set of pixels to the target pixel. The operation(s) performed at 410 may involve determining a weight for the individual pixels in the fourth set with respect to its color contribution to the mixture of colors representing the color of the target pixel. In some embodiments, the weights of the individual pixels in the fourth set can be combined to obtain a third combined weight. In those embodiments, the third amount of opacity information flow can be determined based on the third combined weight. In some exemplary implementations, 410 may be implemented by Intra-U information flow component the same as or substantially to Intra-U information flow component 110 as described and illustrated herein.

At 412, a fourth amount of opacity information flow can be determined. The fourth amount of opacity information flow indicates how much opacity information may flow from the fifth set of pixels to the target pixel. The operation(s) performed at 412 may involve determining a weight for the individual pixels in the fifth set with respect to its color contribution to the mixture of colors representing the color of the target pixel. In some embodiments, the weights of the individual pixels in the fifth set can be combined to obtain a fourth combined weight. In those embodiments, the fourth amount of opacity information flow can be determined based on the fourth combined weight. In some exemplary implementations, 412 may be implemented by local information flow component the same as or substantially to local information flow component 112 as described and illustrated herein.

At 414, one or more of the first, second, third and fourth opacity information flows may be combined to obtain a final energy function; and opacity information for the target pixel may be estimated by solving the final energy function. The operation(s) at 414 may involve combining one or more energy terms from the information flows to obtain the final energy functions, solving the opacity value for the target pixel by minimizing the final energy function, and/or any other operations. In some exemplary implementations, 414 may be implemented by linear system component the same as or substantially to linear system component 114 as described and illustrated herein.

At 416, the image obtained at 402 may be re-rendered based on the opacity information for the target pixel estimated at 414. Image 208 in FIG. 2 is an example of a trimap of an image that is re-rendered at 416 based on the first and second amount opacity information flow. Image 210 in FIG. 2 is an example of a trimap of an image that is re-rendered at 416 based on the first, second and third amount opacity information flow. Image 212 in FIG. 2 is an example of a trimap of an image that is re-rendered at 416 based on the first, second, third and fourth amount opacity information flow. In some exemplary implementations, 416 may be implemented by image rendering component 116 the same as or substantially to the image rendering component 116 as described and illustrated herein.

V. Example Computer System

Figure 5:
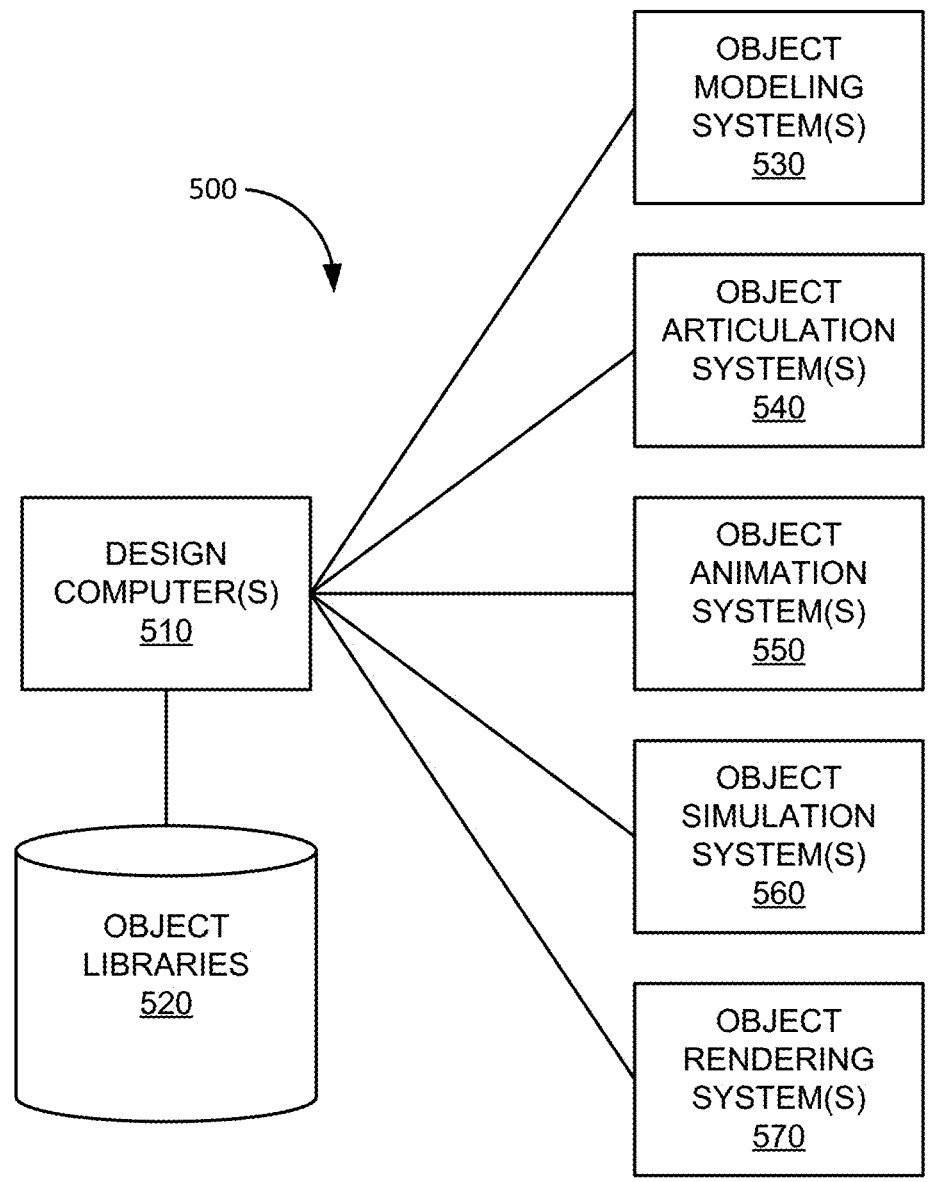
FIG. 5 is a simplified block diagram of system for creating computer graphics imagery (CGI) and computer-aided animation that may implement or incorporate various embodiments in accordance with the disclosure.

FIG. 5 is a simplified block diagram of system 500 for creating computer graphics imagery (CGI) and computer-aided animation that may implement or incorporate various embodiments in accordance with the disclosure. In this example, system 500 can include one or more design computers 510, object library 520, one or more object modeler systems 530, one or more object articulation systems 540, one or more object animation systems 550, one or more object simulation systems 560, and one or more object rendering systems 570. Any of the systems 530-570 may be invoked by or used directly by a user of the one or more design computers 510 and/or automatically invoked by or used by one or more processes associated with the one or more design computers 510. Any of the elements of system 500 can include hardware and/or software elements configured for specific functions.

The one or more design computers 510 can include hardware and software elements configured for designing CGI and assisting with computer-aided animation. Each of the one or more design computers 510 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 510 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 510 acting as a modeler may employ one or more systems or tools to design, create, or modify objects within a computer-generated scene. The modeler may use modeling software to sculpt and refine a 3D model to fit predefined aesthetic needs of one or more character designers. The modeler may design and maintain a modeling topology conducive to a storyboarded range of deformations. In another example, a user of the one or more design computers 510 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 510 acting as an animator may employ one or more systems or tools to specify motion and position of one or more objects over time to produce an animation.

Object library 520 can include elements configured for storing and accessing information related to objects used by the one or more design computers 510 during the various stages of a production process to produce CGI and animation. Some examples of object library 520 can include a file, a database, or other storage devices and mechanisms. Object library 520 may be locally accessible to the one or more design computers 510 or hosted by one or more external computer systems.

Some examples of information stored in object library 520 can include an object itself, metadata, object geometry, object topology, rigging, control data, animation data, animation cues, simulation data, texture data, lighting data, shader code, or the like. An object stored in object library 520 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 530 can include hardware and/or software elements configured for modeling one or more objects. Modeling can include the creating, sculpting, and editing of an object. In various embodiments, the one or more object modeling systems 530 may be configured to generated a model to include a description of the shape of an object. The one or more object modeling systems 530 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 530 may further generate model data (e.g., 2D and 3D model data) for use by other elements of system 500 or that can be stored in object library 520. The one or more object modeling systems 530 may be configured to allow a user to associate additional information, metadata, color, lighting, rigging, controls, or the like, with all or a portion of the generated model data.

The one or more object articulation systems 540 can include hardware and/or software elements configured to articulating one or more computer-generated objects. Articulation can include the building or creation of rigs, the rigging of an object, and the editing of rigging. In various embodiments, the one or more articulation systems 540 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 540 may further generate articulation data (e.g., data associated with controls or animations variables) for use by other elements of system 500 or that can be stored in object library 520. The one or more object articulation systems 550 may be configured to allow a user to associate additional information, metadata, color, lighting, rigging, controls, or the like, with all or a portion of the generated articulation data.

The one or more object animation systems 550 can include hardware and/or software elements configured for animating one or more computer-generated objects. Animation can include the specification of motion and position of an object over time. The one or more object animation systems 550 may be invoked by or used directly by a user of the one or more design computers 510 and/or automatically invoked by or used by one or more processes associated with the one or more design computers 510.

In various embodiments, the one or more animation systems 550 may be configured to enable users to manipulate controls or animation variables or utilized character rigging to specify one or more key frames of animation sequence. The one or more animation systems 550 generate intermediary frames based on the one or more key frames. In some embodiments, the one or more animation systems 550 may be configured to enable users to specify animation cues, paths, or the like according to one or more predefined sequences. The one or more animation systems 550 generate frames of the animation based on the animation cues or paths. In further embodiments, the one or more animation systems 550 may be configured to enable users to define animations using one or more animation languages, morphs, deformations, or the like.

The one or more object animations systems 550 may further generate animation data (e.g., inputs associated with controls or animations variables) for use by other elements of system 500 or that can be stored in object library 520. The one or more object animations systems 550 may be configured to allow a user to associate additional information, metadata, color, lighting, rigging, controls, or the like, with all or a portion of the generated animation data.

The one or more object simulation systems 560 can include hardware and/or software elements configured for simulating one or more computer-generated objects. Simulation can include determining motion and position of an object over time in response to one or more simulated forces or conditions. The one or more object simulation systems 560 may be invoked by or used directly by a user of the one or more design computers 510 and/or automatically invoked by or used by one or more processes associated with the one or more design computers 510.

In various embodiments, the one or more object simulation systems 560 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 560 may be used to simulate the behavior of objects, such as hair, fur, and cloth, in response to a physics model and/or animation of one or more characters and objects within a computer-generated scene.

The one or more object simulation systems 560 may further generate simulation data (e.g., motion and position of an object over time) for use by other elements of system 100 or that can be stored in object library 520. The generated simulation data may be combined with or used in addition to animation data generated by the one or more object animation systems 550. The one or more object simulation systems 560 may be configured to allow a user to associate additional information, metadata, color, lighting, rigging, controls, or the like, with all or a portion of the generated simulation data.

The one or more object rendering systems 570 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 570 may be invoked by or used directly by a user of the one or more design computers 510 and/or automatically invoked by or used by one or more processes associated with the one or more design computers 510. One example of a software program embodied as the one or more object rendering systems 570 can include PhotoRealistic RenderMan, or PRMan, produced by Pixar Animations Studios of Emeryville, Calif.

In various embodiments, the one or more object rendering systems 570 can be configured to render one or more objects to produce one or more computer-generated images or a set of images over time that provide an animation. The one or more object rendering systems 570 may generate digital images or raster graphics images.

In various embodiments, a rendered image can be understood in terms of a number of visible features. Some examples of visible features that may be considered by the one or more object rendering systems 570 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlight rays on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 570 may further render images (e.g., motion and position of an object over time) for use by other elements of system 500 or that can be stored in object library 520. The one or more object rendering systems 570 may be configured to allow a user to associate additional information or metadata with all or a portion of the rendered image.

In various embodiments, the object rendering systems 570 may be configured to implement one or more components shown in FIG. 1 for rendering images by estimating opacity information based on trimaps of the images as described and illustrated herein.

Figure 6:
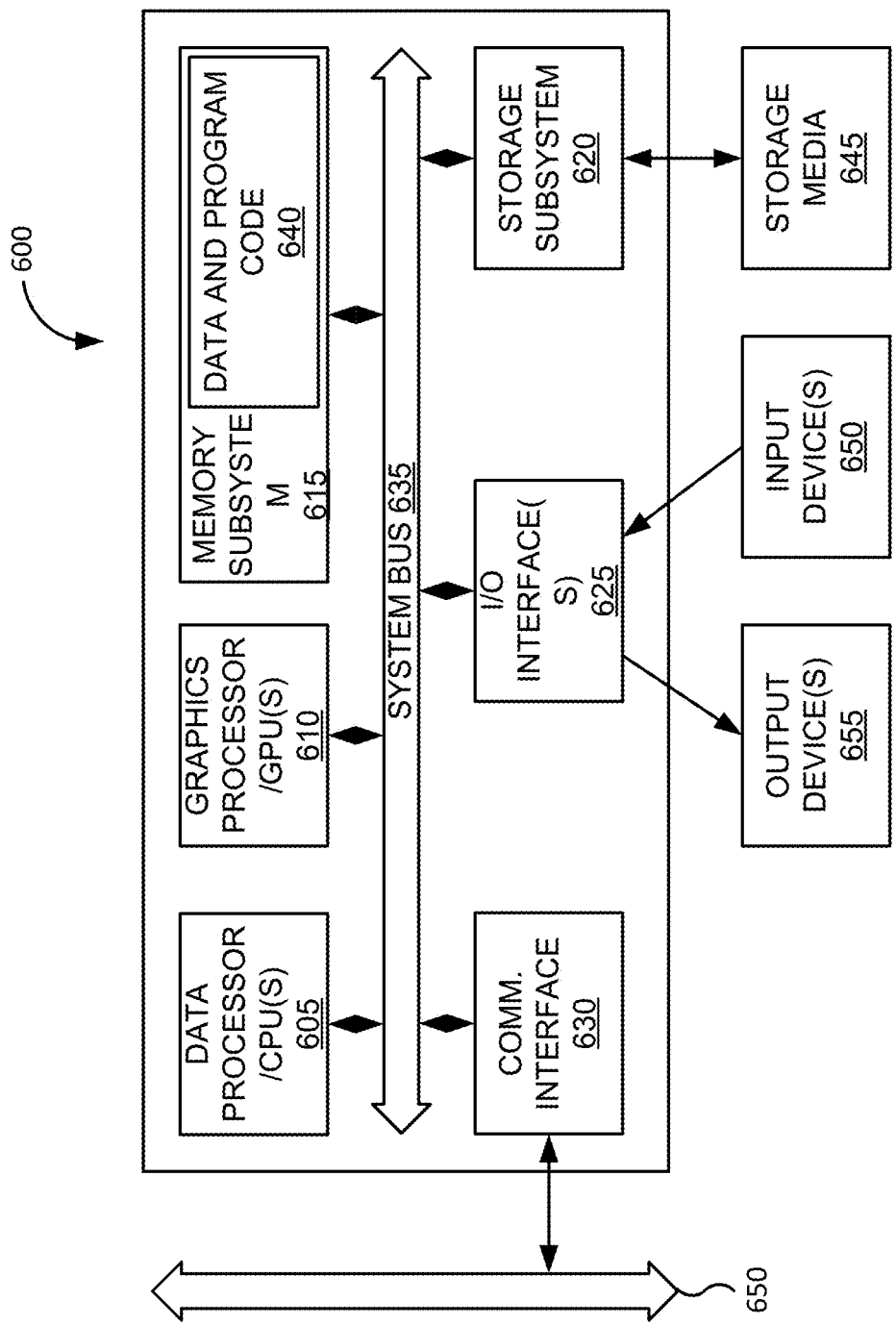
FIG. 6 is a block diagram of computer system that may incorporate an embodiment, be incorporated into an embodiment, or be used to practice any of the innovations, embodiments, and/or examples found within this disclosure.

FIG. 6 is a block diagram of computer system 600. FIG. 6 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 600 and any of its components or subsystems can include hardware and/or software elements configured for performing methods described herein.

Computer system 600 may include familiar computer components, such as one or more one or more data processors or central processing units (CPUs) 605, one or more graphics processors or graphical processing units (GPUs) 610, memory subsystem 615, storage subsystem 620, one or more input/output (I/O) interfaces 625, communications interface 630, or the like. Computer system 600 can include system bus 635 interconnecting the above components and providing functionality, such connectivity and inter-device communication.

The one or more data processors or central processing units (CPUs) 605 can execute logic or program code or for providing application-specific functionality. Some examples of CPU(s) 605 can include one or more microprocessors (e.g., single core and multi-core) or micro-controllers, one or more field-gate programmable arrays (FPGAs), and application-specific integrated circuits (ASICs). As used herein, a processor includes a multi-core processor on a same integrated chip, or multiple processing units on a single circuit board or networked.

The one or more graphics processor or graphical processing units (GPUs) 66 can execute logic or program code associated with graphics or for providing graphics-specific functionality. GPUs 66 may include any conventional graphics processing unit, such as those provided by conventional video cards. In various embodiments, GPUs 66 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 66 may include any number of registers, logic units, arithmetic units, caches, memory interfaces, or the like.

Memory subsystem 615 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 615 can include data and program code 640.

Storage subsystem 620 can also store information using machine-readable articles, information storage devices, or computer-readable storage media. Storage subsystem 620 may store information using storage media 645. Some examples of storage media 645 used by storage subsystem 620 can include floppy disks, hard disks, optical storage media such as CD-ROMS, DVDs and bar codes, removable storage devices, networked storage devices, or the like. In some embodiments, all or part of data and program code 640 may be stored using storage subsystem 620.

The one or more input/output (I/O) interfaces 625 can perform I/O operations. One or more input devices 650 and/or one or more output devices 655 may be communicatively coupled to the one or more I/O interfaces 625. The one or more input devices 650 can receive information from one or more sources for computer system 600. Some examples of the one or more input devices 650 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 650 may allow a user of computer system 600 to interact with one or more non-graphical or graphical user interfaces to enter a comment, select objects, icons, text, user interface widgets, or other user interface elements that appear on a monitor/display device via a command, a click of a button, or the like.

The one or more output devices 655 can output information to one or more destinations for computer system 600. Some examples of the one or more output devices 655 can include a printer, a fax, a feedback device for a mouse or joystick, external storage systems, a monitor or other display device, a communications interface appropriately configured as a transceiver, or the like. The one or more output devices 655 may allow a user of computer system 600 to view objects, icons, text, user interface widgets, or other user interface elements. A display device or monitor may be used with computer system 600 and can include hardware and/or software elements configured for displaying information.

Communications interface 630 can perform communications operations, including sending and receiving data. Some examples of communications interface 630 may include a network communications interface (e.g. Ethernet, Wi-Fi, etc.). For example, communications interface 630 may be coupled to communications network/external bus 650, such as a computer network, a USB hub, or the like. A computer system can include a plurality of the same components or subsystems, e.g., connected together by communications interface 630 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 600 may also include one or more applications (e.g., software components or functions) to be executed by a processor to execute, perform, or otherwise implement techniques disclosed herein. These applications may be embodied as data and program code 640. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 615 and/or storage subsystem 620.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A method for estimating opacity for a pixel in an image, the method being implemented by a processor configured to execute computer programs, the method comprising:
    obtaining regions in the image, the regions including a foreground region, a background region, and an unknown region, wherein the foreground region is fully opaque, the background region is fully transparent and individual pixels the unknown region has an unknown opacity; and
    for each target pixel in the unknown region, estimating opacity for the target pixel by propagating opacity information from other pixels in the image to the pixel, wherein the opacity estimation comprises:
        identifying a first set of pixels that have colors similar to the target pixel;
        determining a first amount of opacity information flow from the first set of pixels to the target pixel; and
        estimating the opacity for the target pixel based on the first amount of opacity information flow.

2. The method of claim 1, wherein identifying the first set of pixels comprises:
performing, in the image, a K-nearest neighbor search with respect to the target pixel to obtain the first set of pixels.

3. The method of claim 1, wherein determining the first amount of opacity information flow from the first set of pixels to the target pixel comprises:
for each pixel in the first set of pixels, determining a weight of the pixel with respect to its color contribution to a color to the target pixel;
combining the weights determined for the pixels in the first set of pixels to obtain a combined weight; and
determining the first amount of opacity information flow based on the combined weights.

4. The method of claim 1, wherein the opacity estimation further comprises:
identifying a second set of pixels and a third set of pixels, the second set of pixels are from pixels within the foreground region and have colors similar to the target pixel, and the third set of pixels are from the background region and have colors similar to the target pixel; and
determining a second amount of opacity information flow from the second set of pixels and third set of pixels to the target pixel; and, wherein estimating the opacity for the target pixel is further based on the second amount of opacity information flow.

5. The method of claim 4, wherein identifying the second set of pixels comprises:
performing, in the foreground region, a K-nearest neighbor search with respect to the target pixel to obtain the second set of pixels; and, wherein identifying the third set of pixels comprises:
performing, in the background region, a K-nearest neighbor search with respect to the target pixel to obtain the second set of pixels.

6. The method of claim 4, wherein determining the second amount of opacity information flow comprises:
obtaining a first combined weight based on the second set of pixels, the first combined weight indicating a color mixture relationship between the pixels in the second set of pixels and the target pixel;
obtaining a second combined weight based on the second set of pixels, the second combined weight indicating a color mixture relationship between the pixels in the second set of pixels and the target pixel; and
determining the second amount of opacity information flow based on the first combined weight and second combined weight.

7. The method of claim 1, wherein the opacity estimation further comprises:
identifying a fourth set of pixels from the unknown region, wherein the fourth set of pixels have colors similar to the target pixel; and
determining a third amount of opacity information flow from the fourth set of pixels to the target pixel; and, wherein estimating the opacity for the target pixel is further based on the third amount of opacity information flow.

8. The method of claim 7, wherein identifying the fourth set of pixels comprises performing, in the unknown region, a K-nearest neighbor search with respect to the target pixel to obtain the fourth set of pixels.

9. The method of claim 7, wherein determining the third amount of opacity information flow comprises obtaining a combined weight based on the fourth set of pixels, the combined weight indicating a color mixture relationship between the fourth set of pixels and the target pixel.

10. The method of claim 1, wherein the opacity estimation further comprises:
identifying a fifth set of pixels from the unknown region, wherein the fifth set of pixels are immediate neighbors to the target pixel; and
determining a fourth amount of opacity information flow from the fifth set of pixels to the target pixel; and, wherein estimating the opacity for the target pixel is further based on the fourth amount of opacity information flow.

11. A system for estimating opacity for a pixel in an image, the system comprising a processor configured to execute computer programs such that when the computer programs are executed, the system is caused to perform:
obtaining regions in the image, the regions including a foreground region, a background region, and an unknown region, wherein the foreground region is fully opaque, the background region is fully transparent and individual pixels the unknown region has an unknown opacity; and
for each target pixel in the unknown region, estimating opacity for the target pixel by propagating opacity information from other pixels in the image to the pixel, wherein the opacity estimation comprises:
identifying a first set of pixels that have colors similar to the target pixel;
determining a first amount of opacity information flow from the first set of pixels to the target pixel; and
estimating the opacity for the target pixel based on the first amount of opacity information flow.

12. The system of claim 11, wherein identifying the first set of pixels comprises performing, in the image, a K-nearest neighbor search with respect to the target pixel to obtain the first set of pixels.

13. The system of claim 11, wherein determining the first amount of opacity information flow from the first set of pixels to the target pixel comprises:
for each pixel in the first set of pixels, determining a weight of the pixel with respect to its color contribution to a color to the target pixel;
combining the weights determined for the pixels in the first set of pixels to obtain a combined weight; and
determining the first amount of opacity information flow based on the combined weights.

14. The system of claim 11, wherein the opacity estimation further comprises:
identifying a second set of pixels and a third set of pixels, the second set of pixels are from pixels within the foreground region and have colors similar to the target pixel, and the third set of pixels are from the background region and have colors similar to the target pixel; and
determining a second amount of opacity information flow from the second set of pixels and third set of pixels to the target pixel; and, wherein estimating the opacity for the target pixel is further based on the second amount of opacity information flow.

15. The system of claim 14, wherein identifying the second set of pixels comprises:
performing, in the foreground region, a K-nearest neighbor search with respect to the target pixel to obtain the second set of pixels; and, wherein identifying the third set of pixels comprises:

performing, in the background region, a K-nearest neighbor search with respect to the target pixel to obtain the second set of pixels.

16. The system of claim 14, wherein determining the second amount of opacity information flow comprises:
   obtaining a first combined weight based on the second set of pixels, the first combined weight indicating a color mixture relationship between the pixels in the second set of pixels and the target pixel;
   obtaining a second combined weight based on the second set of pixels, the second combined weight indicating a color mixture relationship between the pixels in the second set of pixels and the target pixel; and
   determining the second amount of opacity information flow based on the first combined weight and second combined weight.

17. The system of claim 11, wherein the opacity estimation further comprises:
   identifying a fourth set of pixels from the unknown region, wherein the fourth set of pixels have colors similar to the target pixel; and
   determining a third amount of opacity information flow from the fourth set of pixels to the target pixel; and, wherein estimating the opacity for the target pixel is further based on the third amount of opacity information flow.

18. The system of claim 17, wherein identifying the fourth set of pixels comprises performing, in the unknown region, a K-nearest neighbor search with respect to the target pixel to obtain the fourth set of pixels.

19. The system of claim 17, wherein determining the third amount of opacity information flow comprises obtaining a combined weight based on the fourth set of pixels, the combined weight indicating a color mixture relationship between the fourth set of pixels and the target pixel.

20. The system of claim 11, wherein the opacity estimation further comprises:
   identifying a fifth set of pixels from the unknown region, wherein the fifth set of pixels are immediate neighbors to the target pixel; and
   determining a fourth amount of opacity information flow from the fifth set of pixels to the target pixel; and, wherein estimating the opacity for the target pixel is further based on the fourth amount of opacity information flow.

* * * * *

UNITED STATES PATENT AND TRADEMARK OFFICE
CERTIFICATE OF CORRECTION

PATENT NO. : 10,650,524 B2  
APPLICATION NO. : 15/887871  
DATED : May 12, 2020  
INVENTOR(S) : Aksoy et al.

Page 1 of 1

It is certified that error appears in the above-identified patent and that said Letters Patent is hereby corrected as shown below:

On the Title Page

Item (73):
Replace "DISNEY ENTERPRISES, INC., Burbank, CA (US); ETH ZÜRUCH (EIDGENÖSSISCHE TECHNISCHE HOCHSCHULE ZÜRICH), Zürich (CH)" with --DISNEY ENTERPRISES, INC., Burbank, CA (US); ETH ZÜRICH (EIDGENÖSSISCHE TECHNISCHE HOCHSCHULE ZÜRICH), Zürich (CH)--

Signed and Sealed this  
Fourteenth Day of July, 2020

Andrei Iancu  
*Director of the United States Patent and Trademark Office*